US012643344B2

(12) United States Patent
Blandina

(10) Patent No.: US 12,643,344 B2
(45) Date of Patent: Jun. 2, 2026

(54) ANTI-AQUAPLANING SYSTEM FOR VEHICLES AND RELATED METHOD

(71) Applicant: Easy Rain I.S.p.A., Milan (IT)

(72) Inventor: Giovanni Blandina, Milan (IT)

(73) Assignee: Easy Rain I.S.p.A., Milan (IT)

( * ) Notice: Subject to any disclaimer, the term of this patent is extended or adjusted under 35 U.S.C. 154(b) by 258 days.

(21) Appl. No.: 18/557,338

(22) PCT Filed: Feb. 28, 2022

(86) PCT No.: PCT/IB2022/051746
§ 371 (c)(1),
(2) Date: Oct. 26, 2023

(87) PCT Pub. No.: WO2022/229717
PCT Pub. Date: Nov. 3, 2022

(65) Prior Publication Data
US 2024/0217268 A1 Jul. 4, 2024

(30) Foreign Application Priority Data

Apr. 30, 2021 (IT) ........................ 102021000011108

(51) Int. Cl.
B60B 39/02 (2006.01)

(52) U.S. Cl.
CPC .......... B60B 39/022 (2013.01); B60B 39/023 (2013.01)

(58) Field of Classification Search
CPC ..... B60B 39/022; B60B 390/23; B60B 39/00; B60B 39/02; B60B 39/06; B60B 39/083; B60B 2900/721; B60B 39/021; B60N 39/02; B60S 1/02

USPC ......................................................... 280/855
See application file for complete search history.

(56) References Cited

U.S. PATENT DOCUMENTS

| 6,488,217 B1 * | 12/2002 | Donastorg | ............ B60B 39/024 |
| | | | 239/428 |
| 9,096,983 B1 * | 8/2015 | Mejia | .................... E01H 10/007 |
| 9,440,493 B1 * | 9/2016 | Ahern | .................. B60B 39/025 |
| 9,849,724 B2 * | 12/2017 | Blandina | ............... B60B 39/025 |

(Continued)

FOREIGN PATENT DOCUMENTS

| DE | 202005020440 | 2/2006 |
| DE | 102010053308 A1 | 7/2011 |

(Continued)

OTHER PUBLICATIONS

International Search Report and Written Opinion dated Jul. 7, 2022. 12 pages.

(Continued)

*Primary Examiner* — James A Shriver, II
*Assistant Examiner* — Hilary L Johns
(74) *Attorney, Agent, or Firm* — RMCK Law Group PLC

(57) ABSTRACT

An anti-aquaplaning system for a motor vehicle includes: a storage unit for operating liquids, a mixing unit, a supply unit, and a dispensing unit. The dispensing unit includes at least a first injector and a second injector configured for the injection of liquid to the ground at the front of, respectively, a right tread and a left tread of a right wheel and a left wheel of a motor vehicle front axle. The anti-aquaplaning system operates with an operating mixture defined by operating fluids stored in a main tank and in at least one auxiliary tank.

9 Claims, 3 Drawing Sheets

(56) References Cited

U.S. PATENT DOCUMENTS

| | | | | |
|---|---|---|---|---|
| 10,195,898 | B2 * | 2/2019 | Toros ..................... | B60B 39/025 |
| 10,619,992 | B2 * | 4/2020 | Darrer ................... | G01M 17/02 |
| 11,084,325 | B2 * | 8/2021 | Blundell ............... | B60B 39/025 |
| 11,639,185 | B2 * | 5/2023 | Beaurepaire ............ | G08G 1/22 |
| | | | | 701/26 |
| 2015/0102594 | A1 * | 4/2015 | Blandina ............... | B60B 39/026 |
| | | | | 280/855 |
| 2016/0089933 | A1 * | 3/2016 | Toros ..................... | B60B 39/10 |
| | | | | 701/36 |
| 2019/0168541 | A1 * | 6/2019 | Blundell ............... | B60B 39/022 |

FOREIGN PATENT DOCUMENTS

| | | | | | |
|---|---|---|---|---|---|
| FR | 2912080 | A3 | 8/2008 | | |
| JP | 2000264009 | A | 9/2000 | | |
| JP | 2019521909 | A | 8/2019 | | |
| WO | WO-9814335 | A1 * | 4/1998 | ............. | B60B 39/02 |

OTHER PUBLICATIONS

JP Office Action dated Dec. 16, 2025. 4 pages with machine translation.

* cited by examiner

ANTI-AQUAPLANING SYSTEM FOR VEHICLES AND RELATED METHOD

CROSS-REFERENCE TO RELATED APPLICATION

This application is a 371 National Stage of International Application No. PCT/IB2022/051746, filed Feb. 28, 2022, which claims priority to Italian Patent Application No. 102021000011108 filed Apr. 30, 2021. The disclosure of each of the above applications is incorporated herein by reference in its entirety.

FIELD OF THE INVENTION

The present invention refers to anti-aquaplaning systems for motor vehicles. Specifically, the present invention has been developed with reference to anti-aquaplaning systems based on the injection of liquid at the front of the tread.

KNOWN ART

The Applicant has already developed and proposed anti-aquaplaning systems for vehicles which are based on the injection of liquid at the front of the tread of front wheels of a motor vehicle, wherein the injected liquid is drawn from the tank of the windscreen washer liquid of the motor vehicle. An example of such systems is described in the Italian Industrial Invention Patent Application no. 102014902296915.

One of the most common technical problems affecting such systems resides in the characteristics of the windscreen washer liquid. The latter normally comprises a solution of water and a surfactant-based cleaning agent to clean the windscreen or the rear window: at the injection pressures typical of the windscreen washing system, the presence of surfactants in the liquid does not lead to the formation of high amounts of foam, but in an anti-aquaplaning system the injection pressures may reach around 100-150 bar, therefore generating significant amounts of foam. This has very adverse effects on the performances of the system because it jeopardizes the action of the liquid injection, therefore making the system ineffective in mitigating the aquaplaning effects. A further constraint involves the tank for the windscreen washer liquid: the latter cannot be modified for the supply of the anti-aquaplaning system, because this would involve a difference in the specifications according to the motor vehicle type and to the equipment thereof (with/without anti-aquaplaning system). Moreover, it would be necessary to differentiate the liquids contained in the tanks, a difference being made between the liquids for cars without anti-aquaplaning systems and the liquids for cars with anti-aquaplaning systems.

Object of the Invention

The present invention aims at solving the technical problems mentioned in the foregoing. Specifically, the invention aims at optimizing the simultaneous presence and operation of an anti-aquaplaning system and of the windscreen washing apparatus on board a vehicle by providing a plurality of functions.

SUMMARY OF THE INVENTION

The object of the present invention is achieved by a system and a method having the features set forth in the claims that follow, which are an integral part of the technical disclosure provided herein in relation to the invention.

BRIEF DESCRIPTION OF THE FIGURES

The invention will now be described with reference to the annexed Figures, which are provided by way of non-limiting example only, wherein.

DETAILED DESCRIPTION

Figure 1:
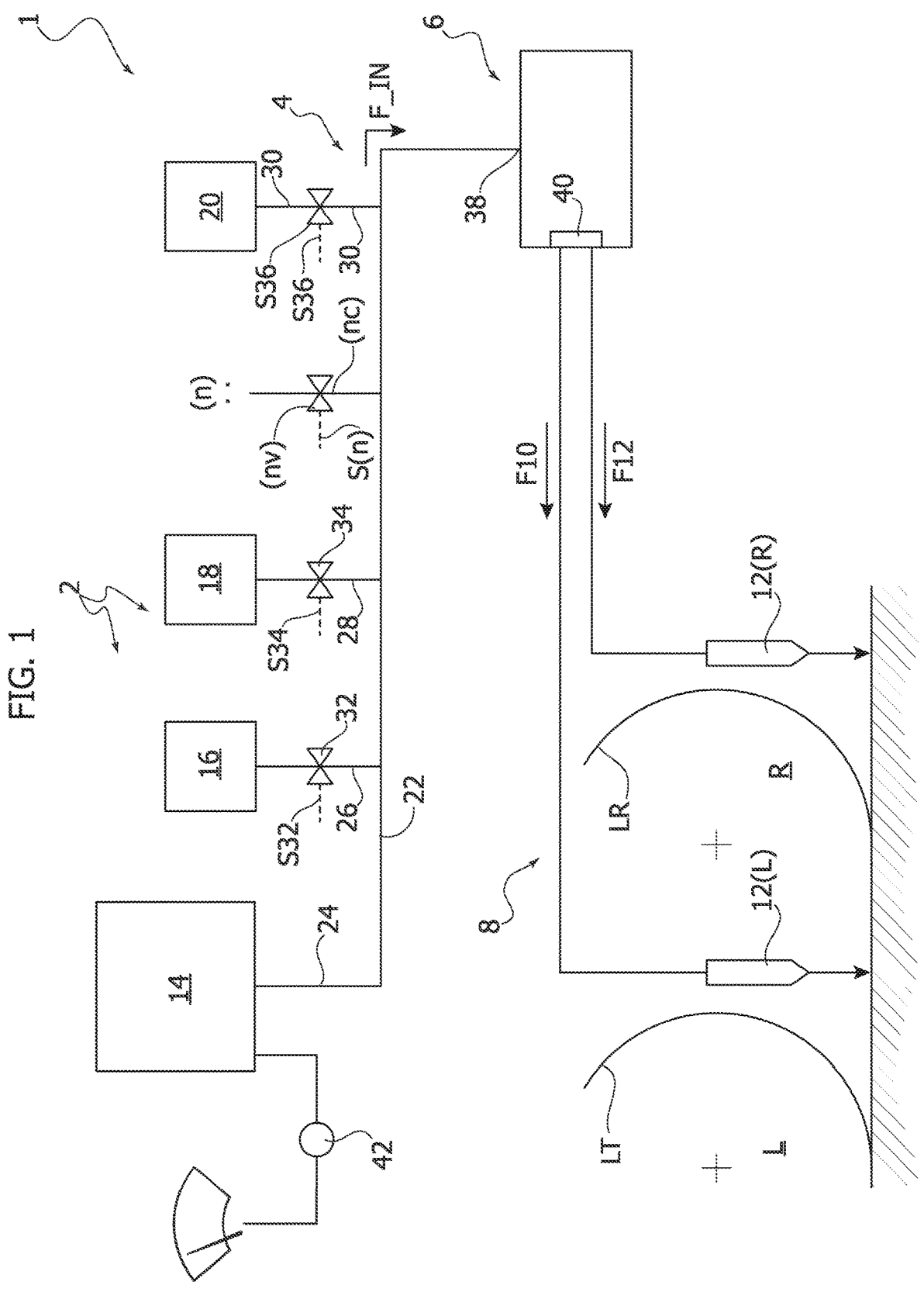
FIG. 1 is a schematical representation of an anti-aquaplaning system according to a first embodiment of the invention.

Reference 1 in FIG. 1 generally denotes an anti-aquaplaning system for a motor vehicle according to first embodiments of the invention.

In the present and in other embodiments, the system includes:

a storage unit 2 for operating liquids, a mixing unit 4, a supply unit 6, a dispensing unit 8, the latter comprising at least a first injector and a second injector 10, 12 configured for the injection of liquid towards the ground in a position at the front of, respectively, a right tread RT and a left tread LT of a right wheel R and a left wheel L of a front axle of a motor vehicle.

It must be kept in mind, moreover, that the dispensing unit 8 may generally be installed at any axle of the motor vehicle (either on the front axle or on the rear axle, or on both); therefore, it is possible to install it at a rear axle, the first and the second injectors 10, 12 being accordingly configured for the injection of liquid towards the ground, respectively at the front of a right tread and a left tread of a right wheel and a left wheel of a rear axle of the motor vehicle, and/or of a front axle of the motor vehicle.

According to the invention, the storage unit 2 includes a main tank 14, configured for storing a main operating liquid, and at least one auxiliary tank 16, 18, (n), 20, wherein reference (n) generally denotes the presence of an $n^{th}$ tank, to indicate the variable number of auxiliary tanks (the present embodiment comprises three auxiliary tanks in addition to the $n^{th}$ tank, but the number may generally vary from a minimum of one to a maximum dictated by operational needs). Each auxiliary tank is configured for storing a corresponding auxiliary operating liquid. The main operating liquid may comprise a conventional windscreen washer solution (water and cleaning agent) or simply water. In preferred embodiments, the main tank 14 is chosen as the tank for windscreen washer fluid of the motor vehicle.

The auxiliary tanks 16, 18, (n), 20 store an auxiliary operating liquid, which is functionally an additive and which is specific for the users connected to the dispensing unit, and configured for mixing with the main operating fluid. Examples of auxiliary operating fluids, the purpose whereof will become apparent from the description in the following, include:

a defoaming liquid, water, soap/cleaning agent (not necessarily for windscreen washing use, see below).

The mixing unit 4 includes a manifold 22 to which there are connected, hydraulically and individually, the main tank 14 and the at least one auxiliary tank 16, 18, (n), 20. Specifically, the following connections lead into manifold 22:

a hydraulic connection 24 for the main tank 14, a hydraulic connection 26 for the auxiliary tank 16, a hydraulic connection 28 for the auxiliary tank 18, a hydraulic connection (nc) for the auxiliary tank (n), a hydraulic connection 30 for the auxiliary tank 20.

The mixing unit 6 moreover comprises an electrically operated valve for each auxiliary tank, specifically:

an electrically operated valve 32 on the hydraulic connection 26 of the auxiliary tank 16, the valve 32 being driven by a driving signal S32, an electrically operated valve 34 on the hydraulic connection 28 of the auxiliary tank 18, the valve 32 being driven by a driving signal S34, an electrically operated valve 36 on the hydraulic connection 30 of the auxiliary tank 20, the valve 36 being driven by a driving signal S36, (generally) an electrically operated valve (nv) on the hydraulic connection (nc) of the $n^{th}$ auxiliary tank (n), the valve (nv) being driven by a driving signal (sn).

Each electrically operated valve is configured for selectively enabling the flow of auxiliary operating liquid from the respective auxiliary tank towards the manifold 22. Therefore, each valve may be operated so as to take a closed position, wherein the flow is blocked, and an open position, wherein the flow is enabled.

In this embodiment, the supply unit 6 includes a pump comprising an inlet port 38 and a delivery port 40. In the diagram of FIG. 1, it may be observed that the manifold 20, and with it the tanks 14, 16, 18, 20, (n), are hydraulically connected to the pump inlet port 38. For the auxiliary tanks, the hydraulic connection is enabled when the valves 32, 34, 36 (nv) are in an open position, while the hydraulic connection of the main tank 14 is always enabled.

Each valve 32, 34, 36, (nv) is therefore configured for selectively enabling a flow of auxiliary operating liquid in the hydraulic connection between the corresponding auxiliary tank and the manifold 22, so as to mix the main operating liquid, coming from tank 14, and a corresponding—selected—auxiliary operating liquid, thereby defining an operating mixture of the system. It must be kept in mind, moreover, that in certain embodiments, depending on the nature of the main and auxiliary operating liquids, the operating mixture may comprise the main operating liquid and two or more auxiliary operating liquids. The supply unit 6, therefore, is configured for drawing the operating mixture from the manifold 22 through the intake port 38 and for delivering it to the dispensing unit 8, specifically to the injectors 10, 12.

Tank 14 is moreover connected to a conventional windscreen washing pump 42, which is smaller than the pump of the supply unit 6 and which is configured for drawing the main operating liquid directly from tank 14 for washing the windows of the motor vehicle.

The operation of system 1 is as follows.

Thanks to the mixing unit, it is possible to define an operating mixture, in the present case to be 10, 12 of the anti-delivered to the injectors aquaplaning systems, having optimized features for the specific use. In a preferred embodiment, comprising tank 14 and only one auxiliary tank 16, the former is normally filled with a conventional windscreen washer water solution, so that pump 42 may draw directly therefrom, thus enabling the normal windscreen washing functions, while the latter is filled with a liquid defoaming agent.

When the need arises to operate the anti-aquaplaning system 1, the operating mixture which in the present case contains the windscreen washer solution stored in tank 14 and the defoaming agent stored in tank 16 is obtained by opening valve 32 and enabling mixing within manifold 22. accordingly, the pump of supply unit 6 draws the operating mixture through port 28 and delivers it directly to the injectors 10, 12 at a pressure of 60-100 bar. With the operation of the system, and unlike the related art, the presence of a defoaming agent destroys the surfactants in the windscreen washer solution, thus inhibiting the formation of foam.

In a further embodiment of system 1, the set of auxiliary tanks may also envisage tank 18 filled with water only (with the possible addition of an anti-freezing agent). In this case, the operating mixture may consist of the combination of the windscreen washer solution drawn from tank 14, the defoaming agent drawn from tank 16 and the water drawn from tank 18 (the procedure is the same: the flow is enabled in connection 28 via valve 34, and the mixing takes place in manifold 22). The water in tank 18 may be used to dilute the windscreen washer solution, so as to further reduce the foam deriving from the injection via injectors 10, 12.

In still a further embodiment, it is possible to envisage the presence of additional tank 20 containing a cleaning agent for cleaning injectors 10, 12 internally. In this case, the operating mixture may comprise a larger amount of water from tank 18 and of defoaming agent from tank 16, so as not to jeopardize the action of the cleaning agent for the injectors, but it is also possible to draw and deliver only the cleaning agent from tank 20.

Figure 2:
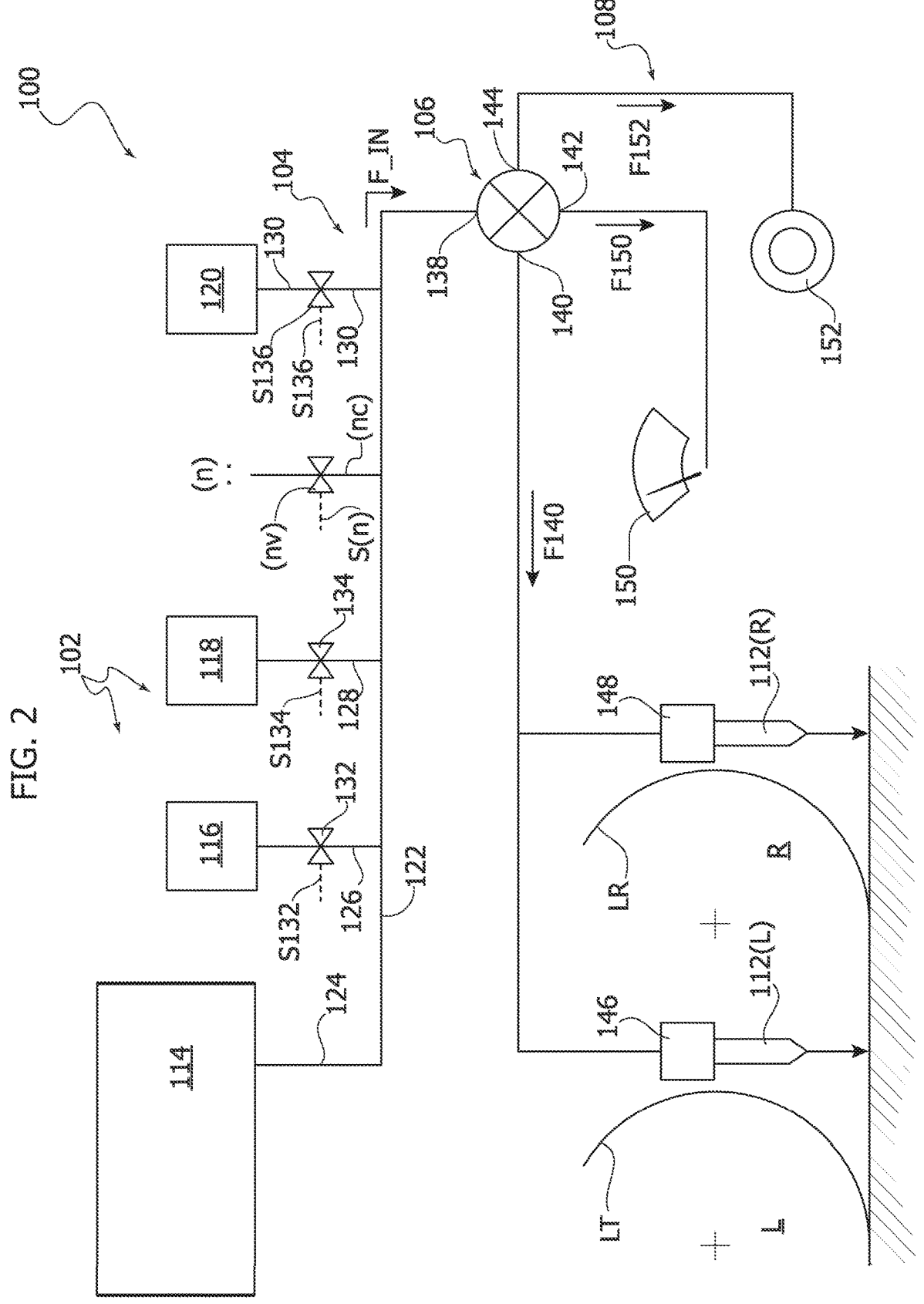
FIG. 2 is a schematical representation of an anti-aquaplaning system according to a second embodiment of the invention.

Referring to FIG. 2, reference 100 denotes an anti-aquaplaning system according to second embodiments of the invention. The system 100 is identical to system 1 as regards the storing unit and the mixing unit, but it differs in the supply unit and in the dispensing unit. The system will anyway be described in its entirety for better reference.

The anti-aquaplaning system 100 includes:

a storage unit 102 for operating liquids, a mixing unit 104, a supply unit 106, a dispensing unit 108, the latter comprising a first and a second injectors 110, 112 configured for the injection of liquid towards the ground respectively at the front of a right tread RT and a left tread LT of a right wheel R and a left wheel L of an axle (front axle, rear axle or both) of the motor vehicle.

The storage unit 102 includes a main tank 114, configured for storing a main operating liquid, and at least one auxiliary tank 116, 118, (n), 120, wherein reference (n), again, generally denotes the presence of an $n^{th}$ tank, to indicate the variable number of auxiliary tanks (the present embodiment comprises three auxiliary tanks in addition to the $n^{th}$ tank, but the number may generally vary from a minimum of one to a maximum dictated by operational needs). Each auxiliary tank is configured for storing a corresponding auxiliary operating liquid.

The main operating liquid may comprise either a conventional windscreen washer solution (water and cleaning agent) or simply water. Again, the main tank 114 is preferably chosen to be the tank for the windscreen washer liquid of the motor vehicle.

The auxiliary tanks 116, 118, (n), 120 store an auxiliary operating liquid, which is functionally an additive and which is specific for the users connected to the dispensing unit 108, and configured for mixing with the main operating fluid. Examples of auxiliary operating fluids, the purpose whereof will become apparent from the description in the following, include:

a defoaming liquid, in the present embodiment, a windscreen washer liquid, water, in the present embodiment, a sensor washing liquid, e.g. for cleaning sensors for advanced driver assistance systems (ADAS) of various nature.

The mixing unit 104 includes a manifold 122 to which there are connected, hydraulically and individually, the main tank 114 and the at least one auxiliary tank 116, 118, (n), 120. Specifically, the following connections lead into manifold 22:

a hydraulic connection 124 for the main tank 114, a hydraulic connection 126 for the auxiliary tank 116, a hydraulic connection 128 for the auxiliary tank 118, a hydraulic connection (nc) for the auxiliary tank (n), a hydraulic connection 130 for the auxiliary tank 120.

The mixing unit 106 moreover comprises an electrically operated valve for each auxiliary tank, specifically:

an electrically operated valve 132 on the hydraulic connection 126 of the auxiliary tank 116, the valve 132 being driven by a driving signal S132, an electrically operated valve 134 on the hydraulic connection 128 of the auxiliary tank 118, the valve 134 being driven by a driving signal S134, an electrically operated valve 136 on the hydraulic connection 130 of the auxiliary tank 120, the valve 136 being driven by a driving signal S136, (generally) an electrically operated valve (nv) on the hydraulic connection (nc) of the $n^{th}$ auxiliary tank (n), the valve (nv) being driven by a driving signal (sn).

Each electrically operated valve is configured for selectively enabling the flow of an auxiliary operating liquid from the respective auxiliary tank towards the manifold 122. Therefore, each valve may be driven so as to take a closed position, wherein the flow is blocked, and an open position, wherein the flow is enabled.

In the present embodiments, the supply unit 106 includes a pump comprising an inlet port 138 and a plurality of delivery ports. Specifically, the pump of supply unit 106 includes a first delivery port 140, a second delivery port 142 and a third delivery port 144.

The first delivery port 142 is hydraulically connected to a first accumulator 146 and to a second accumulator 148, respectively associated to injector 110 and to injector 112; the accumulators 146 and 148 are configured for storing the operating mixture in pressurized conditions, and are hydraulically connected to the corresponding injector 110, 112.

The second delivery port is hydraulically connected to a set of windscreen washer nozzles 150, while the third delivery port is hydraulically connected to a set of sensor washing nozzles 152, e.g. configured for washing the sensors for advanced driver assistance systems (ADAS).

The injectors 110, 112 with the respective accumulators 146, 148, the set of windscreen washer nozzles 150 and the set of sensor washing nozzles 152 are the users of the dispensing unit 108.

In the diagram of FIG. 1 it may be observed that the manifold 122, and with it the tanks 114, 116, 118, 120, (n), are hydraulically connected to the inlet port 138 of the pump. For the auxiliary tanks, the hydraulic connection is enabled when the valves 132, 134, 136 (nv) are in an open position, while the hydraulic connection of the main tank 14 is always enabled.

Each valve 132, 134, 136, (nv) is therefore configured for selectively enabling a flow of auxiliary operating liquid in the hydraulic connection between the corresponding auxiliary tank and the manifold 122, in such a way as to mix the main operating liquid, coming from tank 114, and a corresponding—selected—auxiliary operating liquid, thus defining an operating mixture of the system. It must be kept in mind, moreover, that in certain embodiments, depending on the nature of the main and auxiliary operating liquids, the operating mixture may comprise the main operating liquid and two or more auxiliary operating liquids. Unlike the supply unit 6, the pump of the supply unit 106 is configured for drawing the operating mixture from manifold 122 through inlet port 38, and for selecting the delivery port 140, 142 or 144 which will deliver the drawn operating mixture to the dispensing unit 108.

The basic operation of system 100 is identical to system 1; however, system 100 implements further functions described in the following.

Thanks to the mixing unit 104 it is possible to define a specific operating mixture for each single user of the dispensing unit 108.

The operating mixture for injectors 110, 112 may be defined according to the procedure described in the foregoing, i.e. by mixing the windscreen washer liquid stored in tank 114 with a defoaming agent stored in tank 116. Unlike system 1, in system 100 the pump of the supply unit 106 may be small sized (i.e. may have a reduced flow rate), because the latter pump may implement pressure conditions similar to those of system 1 by loading accumulators 146 and 148 (flow F140 through the delivery port 140), while offering the additional advantage, i.a., of a more rapid action of the system, thanks to the vicinity of the accumulators to the injectors 110, 112.

The operating mixture for the set of windscreen washer nozzles 150 may be defined by only drawing windscreen washer liquid from 114 tank and by delivering it through port 142 (flow F150), while the operating mixture for the set of sensor washing nozzles 152 may be obtained by mixing the windscreen washer liquid stored in tank 114 with the sensor washing liquid stored in tank 118. It will be observed, moreover, that thanks to the features of system 100 it is possible to fill tank 112 simply with water (with the optional addition of an anti-freezing agent), and to assign to each of the tanks 116, 118, 120 an auxiliary operating liquid corresponding to the agent required by the various users of the dispensing unit 108: defoaming agent (injectors 110, 112 of system 100), windscreen washer liquid (set 150) and sensor washing liquid (set 152). In this case, it is moreover possible to replace the defoaming agent with a cleaning agent, in order to keep the injectors clean.

The person skilled in the art will therefore appreciate that the systems 1, 100 make it possible to combine, with a normal on-board equipment for windscreen washing, an on-demand mixing equipment for adding additives or agents required for performing various different functions, without the need of modifying the normal container of windscreen washer fluid (tank 14, 114). The mixing units 4, 104 provide the operating mixture with user-based logic and on demand, therefore making systems 1, 100 extremely flexible and effective. As regards the operation of injectors 10, 12 or 110, 112 only, the systems 1, 100 completely eliminate the onset of foam during injection, thanks to the possibility of adding a defoaming agent, further flexibility being provided by the possibility of separately mixing water, in order to dilute the windscreen washer liquid used as the main operating liquid and, for system 100, with the further possibility of improving the intervention dynamics of the system, thanks to the constant availability of pressurized liquid directly upstream injectors 110, 112 ensured by accumulators 146, 148.

Figures 3, 4:
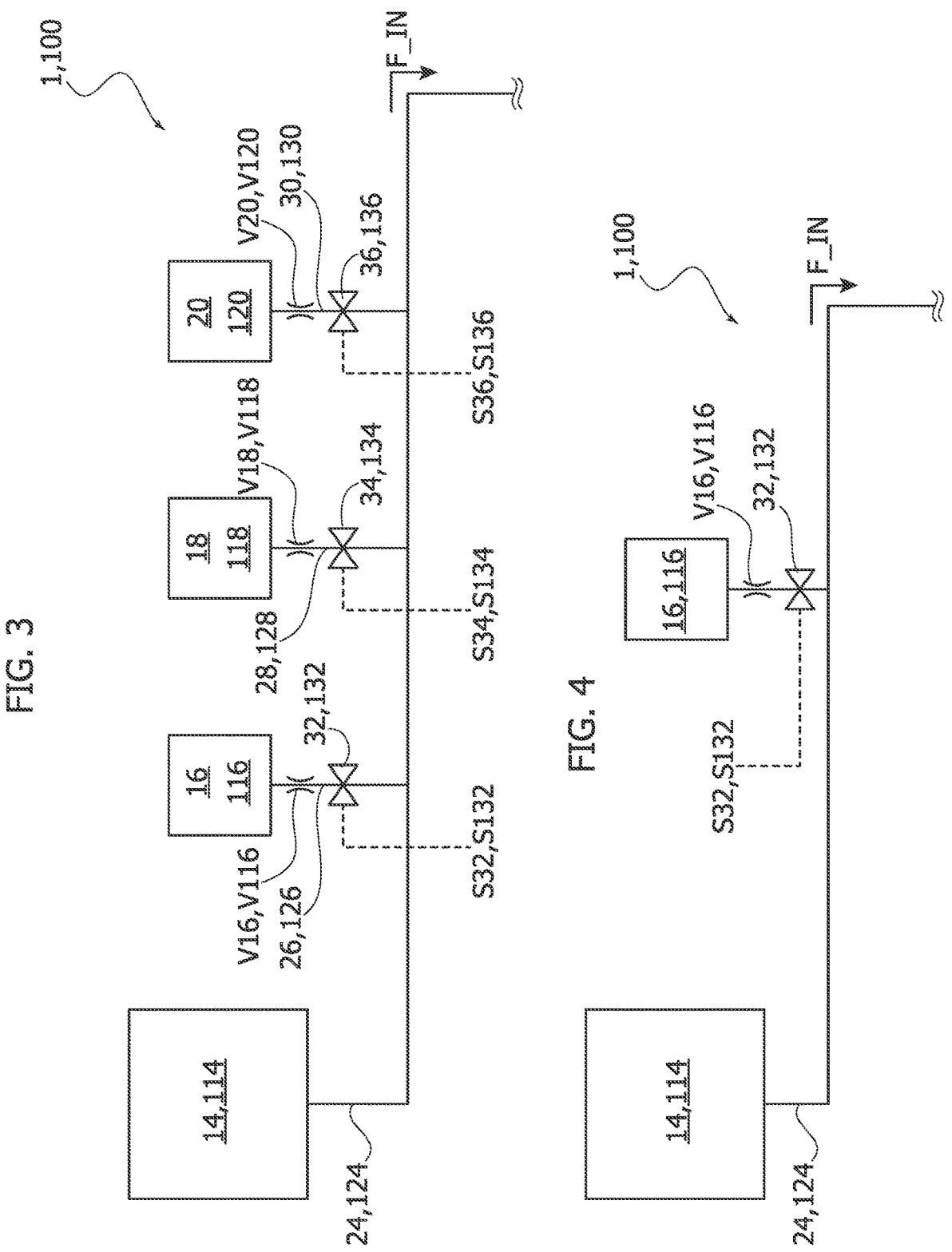
FIGS. 3 and 4 show a further aspect of the invention.

Finally, referring to FIG. 3 and FIG. 4, in preferred embodiments of system 1 and system 100 the mixing unit 4, 104 includes, for each hydraulic connection between the auxiliary tanks 16, 116, 18, 118, 20, 120, a Venturi effect flow element V16, V116, V18, V118, V20, V120 (at least roughly resembling a carburettor jet) hydraulically arranged upstream the electrically operated valves 32, 132, 34, 134, 36, 136). In a comparison with the embodiments of systems 1, 100 of FIGS. 1, 2, the provision of the Venturi effect flow elements enables an accurate adjustment (e.g. by choosing the inner diameter of flow elements V16, V116, V18, V118, V20, V120) of the amount of auxiliary liquid which is to be mixed with the main liquid by the mixing unit, similarly (but with only partially analogous processes) to the case of mixing air and fuel in a carburettor. The view in FIG. 3 exemplifies embodiments which envisage the presence of more than one auxiliary tank, while FIG. 4 exemplifies embodiments—which are preferable in certain applications—having only one auxiliary tank 16, 116.

In an embodiment of system 100, the structure of FIG. 4 may envisage the tank 116 storing a windscreen washer liquid as auxiliary fluid, which is mixed with the main liquid (water) only when the flow F_IN does not need to be delivered to injectors 110, 112, i.e. only when it is necessary to mix water and windscreen washer liquid for cleaning the windscreen or the rear window. Conversely, the mixing of the windscreen washer liquid with the water in the main tank 114 is inhibited when it is necessary to deliver the flow F_IN to the injectors 110, 112.

Of course, the implementation details and the embodiments may vary, even appreciably, from what has been described and illustrated herein, without departing from the scope of the present invention, as defined in the annexed claims.

The invention claimed is:

1. An anti-aquaplaning system for a motor vehicle, including:
   a storage unit for operating liquids,
   a mixing unit,
   a supply unit, and
   a dispensing unit, said dispensing unit comprising at least a first injector and a second injector configured for injection of liquid to the ground in front of, respectively, a right tread and a left tread of a right wheel and a left wheel of a motor vehicle axle, respectively,
   wherein:
   said storage unit includes a main tank configured for storing a main operating liquid, and at least one auxiliary tank configured for storing a corresponding auxiliary operating liquid, each of said main tank and said at least one auxiliary tank having a hydraulic connection to said supply unit,
   said mixing unit is configured to mix a predetermined amount of said main operating liquid with a predetermined amount of said at least one of said corresponding auxiliary operating liquid, thereby defining an operating mixture of the system, said supply unit is configured to deliver said operating mixture to said first injector and said second injector,
   said supply unit includes a pump comprising an inlet port and a delivery port, said mixing unit comprising a manifold hydraulically connected to said inlet port and to which said main tank and said at least one auxiliary tank are hydraulically and individually connected, and
   said mixing unit comprising an electrically operated valve for each of said at least one auxiliary tank configured to selectively enable a flow of liquid in the hydraulic connection between said at least one auxiliary tank and the manifold, so as to allow mixing between the main operating liquid and the corresponding auxiliary operating liquid thereby defining the operating mixture of the system, said supply unit being configured for drawing said operating mixture from the manifold through the inlet port for delivery thereof to the dispensing unit.

2. The anti-aquaplaning system according to claim 1, wherein said main tank is a tank for windscreen washer liquid of the motor vehicle.

3. The anti-aquaplaning system according to claim 2, wherein said main tank is also hydraulically connected to an additional supply unit configured for the dispensing windscreen washer liquid.

4. The anti-aquaplaning system according to claim 1, wherein said dispensing unit also includes at least one of:
   a set of windscreen washer nozzles,
   a set of sensor cleaning nozzles for cleaning sensors for autonomous driving systems, and
   wherein the supply unit includes at least one additional supply port connected to a corresponding one of said set of windscreen washer nozzles and said set of sensor cleaning nozzles, the supply unit being configured to selectively enable delivery of the operating mixture to a predetermined supply port of the at least one additional supply port.

5. The anti-aquaplaning system according to claim 1, including a first accumulator associated to said first injector and a second accumulator associated to said second injector.

6. The anti-aquaplaning system according to claim 3, further comprising, for each of the at least one auxiliary tank, a venturi effect flow element hydraulically arranged upstream of the electrically operated valve.

7. A method of supplying an operational mixture to a dispensing unit of an anti-aquaplaning system according to claim 1 comprising:
   determining a user of the supply unit to be supplied by the supply unit,
   enabling a flow of the corresponding auxiliary operating liquid from one or more selected auxiliary tanks of the at least one auxiliary tank,
   mixing the main operating liquid with the corresponding auxiliary operating liquid of the one or more selected auxiliary tanks, thereby defining the operating mixture of the system,
   delivering the operating mixture to the determined users via the supply unit.

8. The method of claim 7, including selecting a delivery port of a pump of the supply unit according to the determined users.

9. A motor vehicle comprising the anti-aquaplaning system according to claim 1.

* * * * *